United States Patent
Jung

(10) Patent No.: US 12,491,854 B2
(45) Date of Patent: Dec. 9, 2025

(54) CONTROL METHOD AND APPARATUS FOR ELECTRIC-MECHANICAL BRAKE

(71) Applicant: HYUNDAI MOBIS CO., LTD., Seoul (KR)

(72) Inventor: Jae Won Jung, Seongnam-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 112 days.

(21) Appl. No.: 18/638,795

(22) Filed: Apr. 18, 2024

(65) Prior Publication Data
US 2025/0010833 A1   Jan. 9, 2025

(30) Foreign Application Priority Data
Jul. 5, 2023  (KR) .................... 10-2023-0086903

(51) Int. Cl.
*B60T 13/74* (2006.01)
*B60T 7/04* (2006.01)

(52) U.S. Cl.
CPC ............ *B60T 13/741* (2013.01); *B60T 7/042* (2013.01); *B60T 2270/82* (2013.01)

(58) Field of Classification Search
CPC .... B60T 13/741; B60T 7/042; B60T 2270/82; B60T 8/172; B60T 8/171; B60T 13/74; B60Y 2400/81
See application file for complete search history.

(56) References Cited

U.S. PATENT DOCUMENTS

| 6,189,987 B1 * | 2/2001 | Shimizu | B60T 8/4854 303/155 |
| 7,806,486 B2 * | 10/2010 | Bitz | B60T 8/4081 303/191 |
| 9,868,428 B2 * | 1/2018 | Mahnkopf | B60T 13/745 |

* cited by examiner

*Primary Examiner* — Sizo B Vilakazi
(74) *Attorney, Agent, or Firm* — NovoTechIP International PLLC

(57) ABSTRACT

A method and apparatus for controlling an electro-mechanical brake are disclosed. An embodiment of the present disclosure provides a method for controlling an electro-mechanical brake (EMB) of a vehicle, comprising: measuring a pedal stroke value; determining whether the pedal stroke value exceeds a first threshold; in response to determining that the pedal stroke value does not exceed the first threshold, generating a first braking force for reducing an air gap of the EMB; in response to determining that the pedal stroke value exceeds the first threshold, setting a target braking force for decelerating the vehicle; and after setting the target braking force, generating a second braking force based on the target braking force, wherein a magnitude of the first braking force is determined based on an increase rate of the pedal stroke value over time, and wherein the target braking force is proportional to the pedal stroke value.

10 Claims, 7 Drawing Sheets

<When rate of increase in stroke value over time exceeds second threshold>

<When rate of increase in stroke value over time does not exceed second threshold>

CONTROL METHOD AND APPARATUS FOR ELECTRIC-MECHANICAL BRAKE

CROSS-REFERENCE TO RELATED APPLICATIONS

The present application claims priority to and the benefit of Korean Patent Application No. 10-2023-0086903, filed on Jul. 5, 2023, the entire disclosure of which is incorporated herein by reference.

TECHNICAL FIELD

The present disclosure relates to a control method and apparatus for an electro-mechanical brake.

BACKGROUND

The content described in the present section simply provides background information for the present disclosure and does not constitute related art.

An electro-mechanical brake (EMB) enables more precise control of a braking force as compared to a hydraulic brake. The electro-mechanical brake has quick responsiveness and can accurately control a braking force since a motor is used to directly drive a brake actuator. The electro-mechanical brake reduces a braking distance of a vehicle and sensitively responds to an operation of a driver to increase safety.

The electro-mechanical brake is capable of active braking and independent braking of each wheel. The electro-mechanical brake can compensate for wheel slip or unbalanced braking between respective wheels by independently controlling braking forces of a plurality of wheels.

The electro-mechanical brake improves traveling stability and provides more precise and effective braking even at the time of sudden braking or turning.

The electro-mechanical brake provides additional functions. For example, braking functions such as an anti-lock braking system (ABS), an electronic stability control (ESC), a traction control system (TCS), and an autonomous emergency braking (AEB) can be integrated into and provided to an electric braking system.

In an electro-mechanical brake of the related art, a braking response is delayed due to the presence of an air gap, and a large error occurs between a target braking force and an actual braking force. Here, the air gap refers to a gap between a friction pad and a disc. Due to the presence of the air gap, a time delay occurs in the electro-mechanical brake of the related art until a clamping force is formed, and the responsiveness of the electro-mechanical brake is reduced due to the time delay.

The electro-mechanical brake of the related art generates a braking force abruptly to overcome the error between target braking force and the actual braking force. When the braking force is abruptly generated, there is a problem that an impact may occur in the vehicle. The electro-mechanical brake has a problem in that a greater sense of abrupt braking is caused, resulting in uncomfortable braking, unlike a hydraulic brake. Here, the sense of abrupt braking refers to an operation in which the motor abruptly operates and abruptly decelerates the vehicle.

SUMMARY

In view of the above, the present disclosure is intended to solve these problems, and a main object thereof is to minimize sense of abrupt braking by minimizing an air gap of an electro-mechanical brake to reduce an error between a target braking force and an actual braking force.

Further, another main object of the present disclosure is to minimize sense of abrupt braking by simulating actual braking data of a hydraulic brake to set target data.

An embodiment of the present disclosure provides a method for controlling an electro-mechanical brake (EMB) of a vehicle, comprising: measuring a pedal stroke value; determining whether the pedal stroke value exceeds a first threshold; in response to determining that the pedal stroke value does not exceed the first threshold, generating a first braking force for reducing an air gap of the EMB; in response to determining that the pedal stroke value exceeds the first threshold, setting a target braking force for decelerating the vehicle; and after setting the target braking force, generating a second braking force based on the target braking force, wherein a magnitude of the first braking force is determined based on an increase rate of the pedal stroke value over time, and wherein the target braking force is proportional to the pedal stroke value.

Another embodiment of the present disclosure provides an apparatus for controlling an electro-mechanical brake (EMB) of a vehicle, comprising: a sensor unit including a pedal stroke sensor connected to a brake pedal of the vehicle and configured to measure a stroke of the brake pedal; and a control unit configured to receive, from the sensor unit, a pedal stroke value and control a braking force of the EMB based on the pedal stroke value, wherein the control unit is configured to: determine whether the pedal stroke value exceeds a first threshold; in response to determining that the pedal stroke value does not exceed the first threshold, generate a first braking force for reducing an air gap of the EMB; and in response to determining that the pedal stroke value exceeds the first threshold, set a target braking force based on the pedal stroke value and generate a second braking force based on the target braking force.

As described above, according to the present embodiment, there is an effect that it is possible to minimize sense of abrupt braking by minimizing an air gap of the electro-mechanical brake to reduce an error between the target braking force and an actual braking force.

Further, according to the present embodiment, there is an effect that it is possible to minimize sense of abrupt braking by simulating actual braking data of a hydraulic brake to set target data.

DETAILED DESCRIPTION

Figure 1:
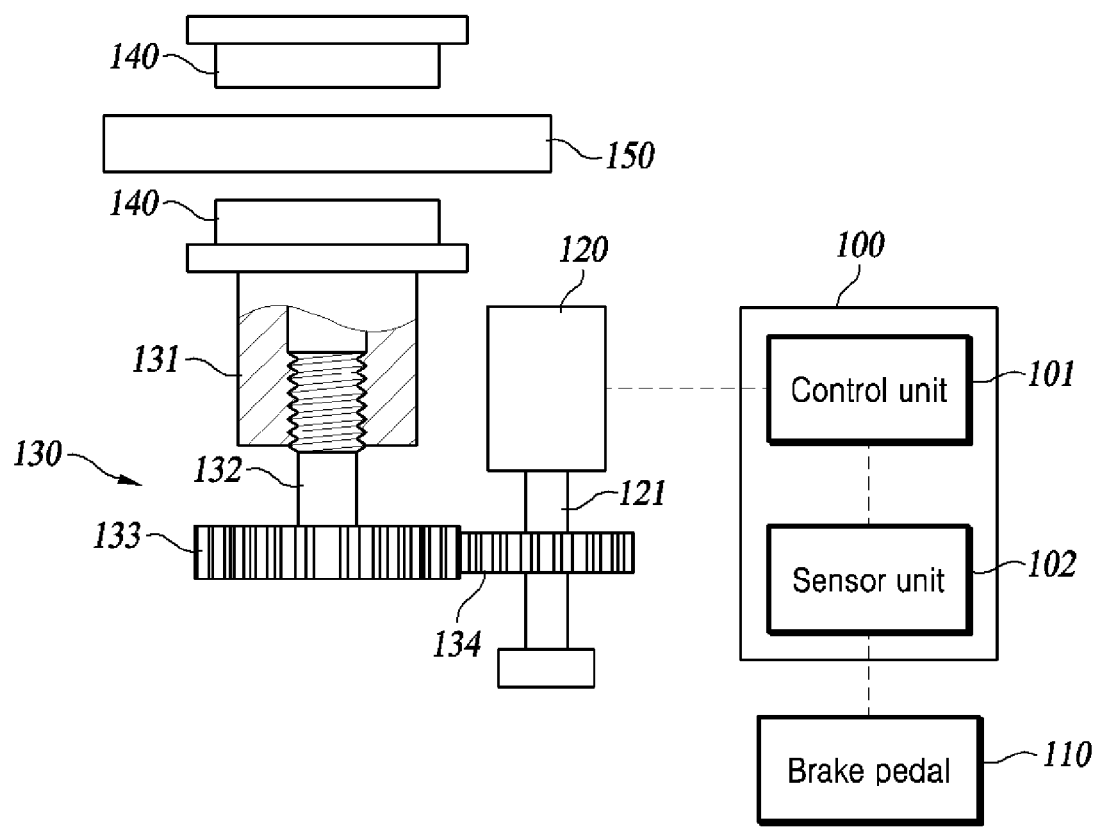
FIG. 1 is a schematic diagram illustrating a control apparatus for an electro-mechanical brake mounted on an electro-mechanical brake according to an embodiment of the present disclosure.

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components.

Throughout the present specification, when a part 'includes' or 'comprises' a component, the part is meant to further include other components, not to exclude thereof unless specifically stated to the contrary.

The terms such as 'unit', 'module', and the like refer to one or more units for processing at least one function or operation, which may be implemented by hardware, software, or a combination thereof.

The following detailed description, together with the accompanying drawings, is intended to describe exemplary embodiments of the present invention and is not intended to represent the only embodiments in which the present invention may be practiced.

FIG. 1 is a schematic diagram illustrating a control apparatus for an electro-mechanical brake mounted on an electro-mechanical brake according to an embodiment of the present disclosure.

Referring to FIG. 1, a control apparatus for an electro-mechanical brake 100 according to an embodiment of the present disclosure may include a control unit 101 and a sensor unit 102. The control apparatus for an electro-mechanical brake 100 according to the present disclosure may be mounted on an electro-mechanical brake including a motor 120, an operator 130, and a friction pad 140.

The sensor unit 102 may include a pedal stroke sensor (not illustrated). The pedal stroke sensor may be connected to a brake pedal 110 of the vehicle. The pedal stroke sensor may measure a stroke depth of the brake pedal. For example, when a driver of the vehicle steps on the brake pedal to a depth of 20 mm, the pedal stroke sensor may measure that the brake pedal has been stepped to the depth of 20 mm. The pedal stroke sensor may be a potentiometer, a displacement sensor, an ultrasonic sensor, or the like.

The control unit 101 is connected to the sensor unit 102 and may receive a pedal stroke value. The control unit 101 may control a braking force of the electro-mechanical brake based on the pedal stroke value and a preset first threshold. In the present disclosure, the first threshold may be set as a value that may correspond to an error in the pedal stroke value. For example, even when a driver does not step on the brake pedal, the pedal stroke value may be generated due to noise in the pedal stroke sensor. Therefore, when the pedal stroke value is equal to or smaller than (i.e., does not exceed) the first threshold, the pedal stroke value may be determined to be an error value, and when the pedal stroke value exceeds the first threshold, the pedal stroke value may be determined to be a normal value. The first threshold may be determined through an experiment.

The control unit 101 may determine whether the pedal stroke value exceeds the first threshold and then generate a first braking force or a second braking force based on a result of the determination. In the present disclosure, the first braking force refers to a braking force for reducing an air gap of the electro-mechanical brake. Here, the air gap refers to a gap between the friction pad 140 and the disc 150 before braking is performed. The control unit 101 may generate the first braking force by controlling the motor through field weakening control. That is, in order to quickly reduce the air gap of the electro-mechanical brake, the control unit 101 may control the motor 120 so that the motor 120 generates a high rotational force by reducing a magnetic flux of the motor 120. A magnitude of the first braking force may be generated to increase in proportion to an increase rate of the pedal stroke value over time. In the present disclosure, the second braking force refers to a braking force generated from the electro-mechanical brake to reach the target braking force. For example, when the target braking force is set to increase linearly from 0 N to 100 N over time, the second braking force may be generated to correspond to the target braking force. Here, N refers to Newton that is an SI unit of a force.

The control unit 101 may control the braking force of the electro-mechanical brake by generating the first braking force or the second braking force. A detailed process in which the control unit 101 controls the braking force of the electro-mechanical brake will be described below with reference to FIGS. 2 to 6.

The motor 120 may receive a command from the control unit 101 and provide a force necessary for braking. The motor 120 may be a direct current (DC) motor, an alternating current (AC) motor, a servo motor, a step motor, or the like. The motor 120 may include a motor shaft 121 on one side of the motor 120. When the motor 120 is supplied with power, the motor shaft 121 may rotate.

The operator 130 may include a first gear 133, a second gear 134, a screw 132, and a piston 131. A center of the second gear 134 may be fixed to the motor shaft 121. The first gear 133 may be configured to mesh with the second gear 134. One side of the screw 132 may be fixed to a center of the first gear 133. The other side of the screw 132 may include a screw thread. The piston 131 may include a receiving groove having threads on an inner peripheral surface. The other side of the screw 132 is inserted into the receiving groove so that the other side of the screw 132 may be screw-coupled to the receiving groove and may be fixed to the piston 131.

The friction pad 140 may be disposed on a movement path of the piston 131. When the piston 131 moves forward toward the friction pad 140, the friction pad 140 may press the disc 150 for braking. When the piston 131 moves backward from the friction pad 140, the friction pad 140 may reduce the pressing of the disc 150 to stop the braking.

Hereinafter, a process of operating the electro-mechanical brake having the control apparatus for an electro-mechanical brake 100 mounted thereon according to the present disclosure will be described.

The control unit 101 determines whether the pedal stroke value exceeds the first threshold. When the control unit 101 determines that the pedal stroke value does not exceed the first threshold, the control unit 101 transmits a first braking force generation command to the motor 120. The motor 120 generates a torque necessary for the first braking force and rotates the motor shaft 121. The motor 120 may quickly rotate the motor shaft 121 using field weakening control. The second gear 134 fixed to the motor shaft 121 rotates at the same angular velocity as the motor shaft 121. The first gear 133 engages with the second gear 134 and rotates. The screw 132 fixed to the center of the first gear 133 rotates at the same angular velocity as the first gear. When the screw 132 rotates, the screw coupling of the other side of the screw 132 to the receiving groove of the piston 131 is released. The piston 131 moves forward toward the friction pad 140 depending on a degree to which the screw coupling is released. When the piston 131 moves forward toward the friction pad 140, the air gap of the electro-mechanical brake decreases. Since the first braking force is generated to reduce the air gap, the friction pad 140 does not press the disc 150.

When the control unit 101 determines that the pedal stroke value exceeds the first threshold, the control unit 101 sets a target braking force proportional to the pedal stroke value. The control unit 101 transmits a second braking force generation command based on the target braking force to the motor 120. The motor 120 generates a torque necessary for the second braking force and rotates the motor shaft 121. The second gear 134 fixed to the motor shaft 121 rotates at the same angular velocity as the motor shaft 121. The first gear 133 engages with the second gear 134 and rotates. The screw 132 fixed to the center of the first gear 133 rotates at the same angular velocity as the first gear. When the screw 132 rotates, the screw coupling of the other side of the screw 132 to the receiving groove of the piston 131 is released. Depending on the degree to which the screw coupling is released, the piston 131 moves forward toward the friction pad 140. When the piston 131 moves forward toward the friction pad 140, the friction pad 140 presses the disc 150 so that the second braking force is generated.

Figure 2:
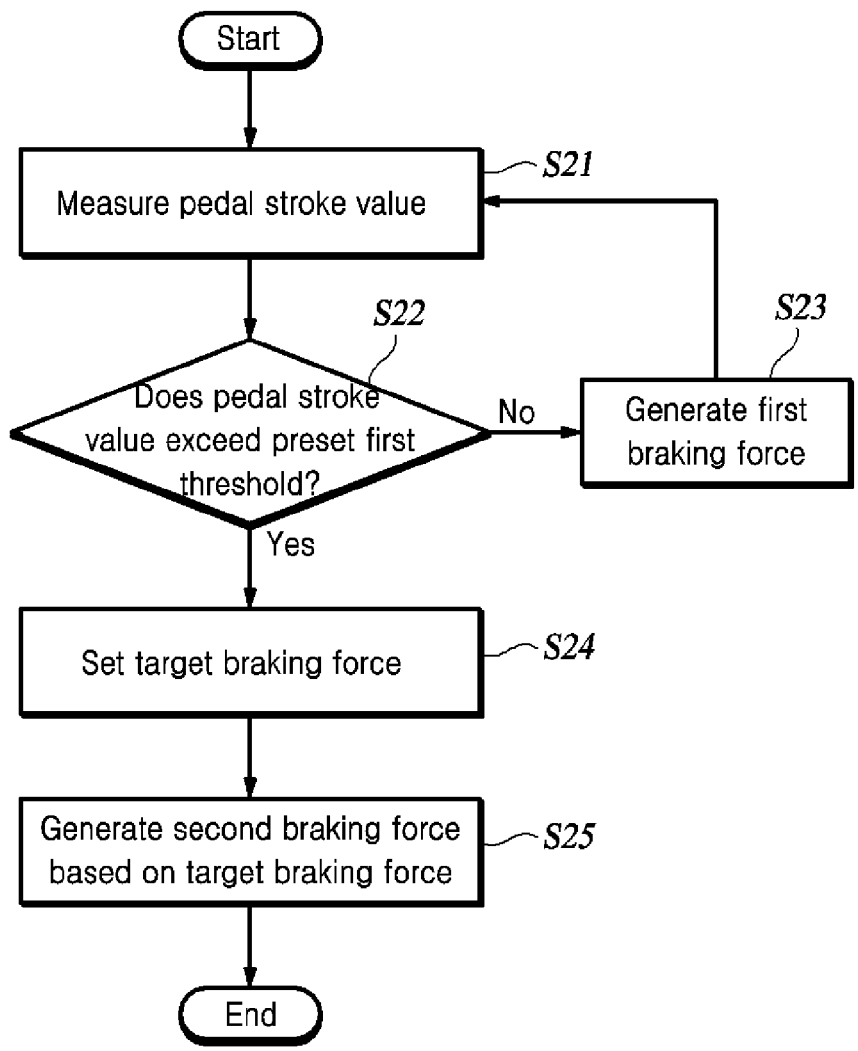
FIG. 2 is a flowchart illustrating a control method for an electro-mechanical brake according to an embodiment of the present disclosure.

FIG. 2 is a flowchart illustrating a control method for an electro-mechanical brake according to an embodiment of the present disclosure.

Referring to FIG. 2, the sensor unit 102 measures the pedal stroke value (S21). The sensor unit 102 transmits the measured pedal stroke value to the control unit 101.

The control unit 101 may compare the pedal stroke value with the preset first threshold and determine whether the pedal stroke value exceeds the first threshold (S22).

When the pedal stroke value is equal to or smaller than (i.e., does not exceed) the first threshold, the control unit 101 may generate the first braking force (S23).

When the pedal stroke value exceeds the first threshold, the control unit 101 may set a target braking force for deceleration of the vehicle (S24). A detailed process in which the control unit 101 sets the target braking force will be described below with reference to FIGS. 3 to 6.

The control unit 101 may generate a second braking force based on the target braking force (S25).

Figure 3:
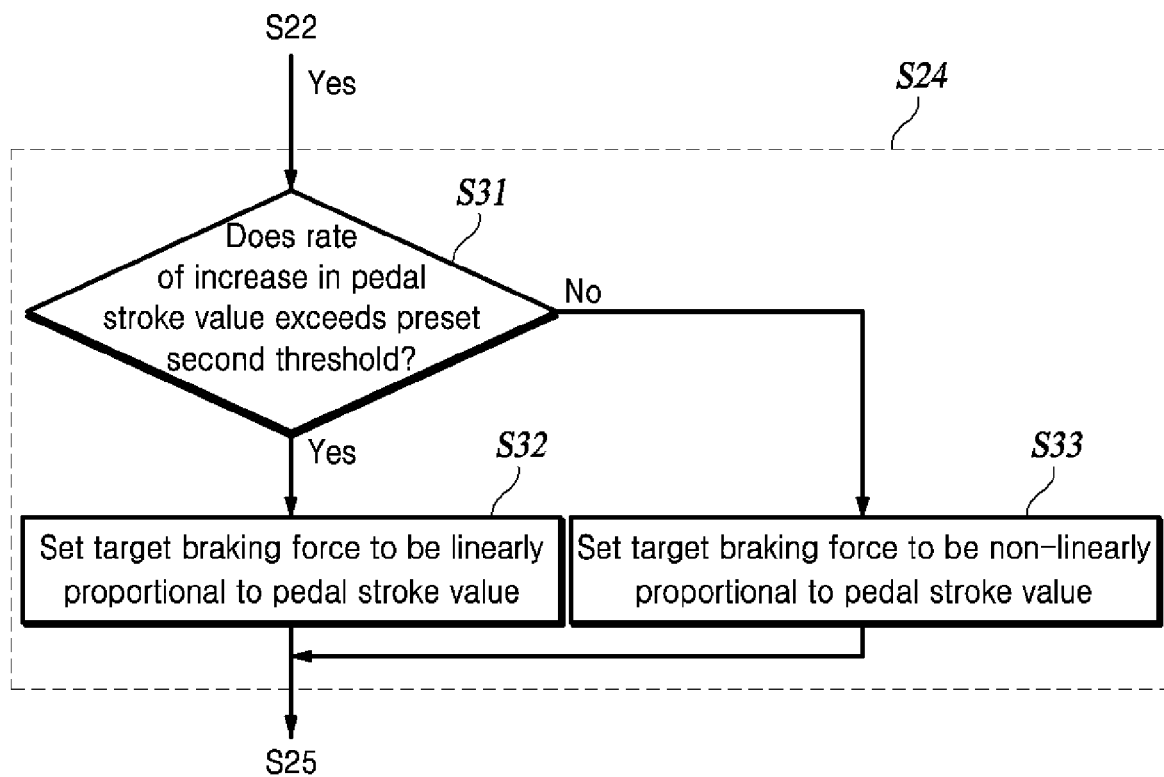
FIG. 3 is a flowchart illustrating a specific example of step S24 of FIG. 2.

FIG. 3 is a flowchart illustrating a specific example of step S24 of FIG. 2.

Figure 4:
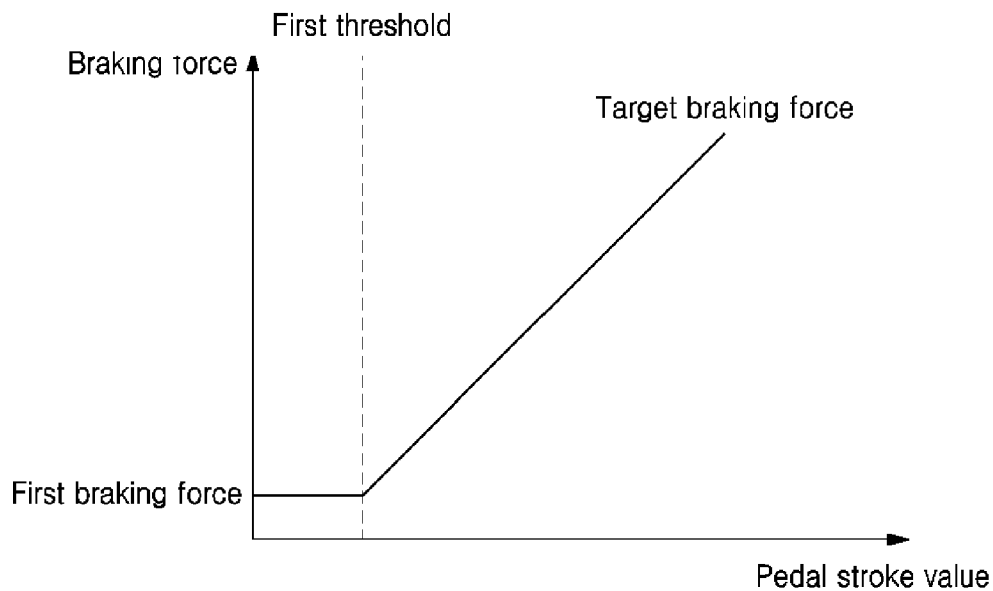
FIG. 4 is a graph showing a comparison between a braking force and a pedal stroke value when the electro-mechanical brake is controlled according to FIG. 3.
Figure 4:
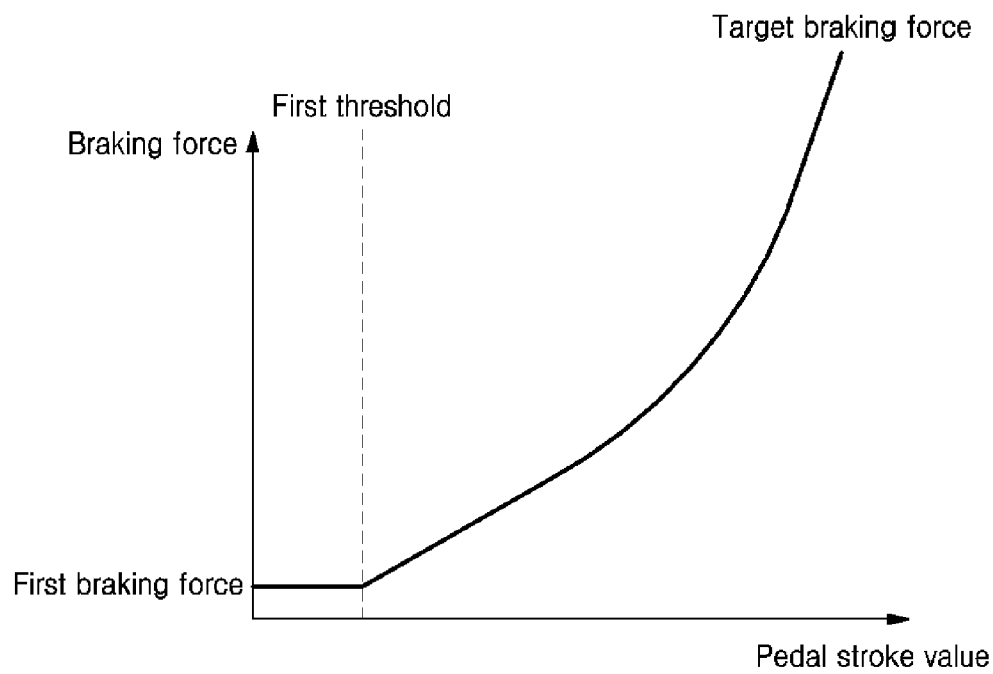

FIG. 4 is a graph showing a comparison between the braking force and a pedal stroke value when the electro-mechanical brake is controlled according to FIG. 3.

Referring to FIGS. 3 and 4, when the pedal stroke value exceeds the first threshold, the control unit 101 determines whether a rate of increase in (or an increase rate of) the pedal stroke value over time exceeds a preset second threshold (S31). In the present disclosure, the second threshold may be set as a reference value for determining whether the electro-mechanical brake is in an abrupt braked state or an emergency braked state. For example, when the driver steps on the brake more abruptly, the rate of increase in the pedal stroke value over time become higher. When the rate of increase in the pedal stroke value over time exceeds the second threshold, the control unit 101 may determine that the electro-mechanical brake is in an abruptly braked state or an emergently braked state. The second threshold may be determined through an experiment.

When the rate of increase in the pedal stroke value over time exceeds the second threshold, the control unit 101 may set the target braking force to be linearly proportional to the pedal stroke value (S32). As can be seen from FIG. 4, the target braking force is set to be linearly proportional to the pedal stroke value, so that the second braking force is generated without delay with respect to the pedal stroke value. Since the second braking force is generated without delay with respect to the pedal stroke value, the electro-mechanical brake can quickly cope with abrupt braking. On the other hand, when the rate of increase in the pedal stroke value over time is equal to or smaller than (i.e., does not exceed) the second threshold, the control unit 101 may set the target braking force to be non-linearly proportional to the pedal stroke value (S33). As can be seen from FIG. 4, since the target braking force is set to be non-linearly proportional to the pedal stroke value, the second braking force may be generated with a delay with respect to the pedal stroke value. Since the second braking force is generated with a delay with respect to the pedal stroke value, it is possible to minimize the abruptness of braking.

Figure 5:
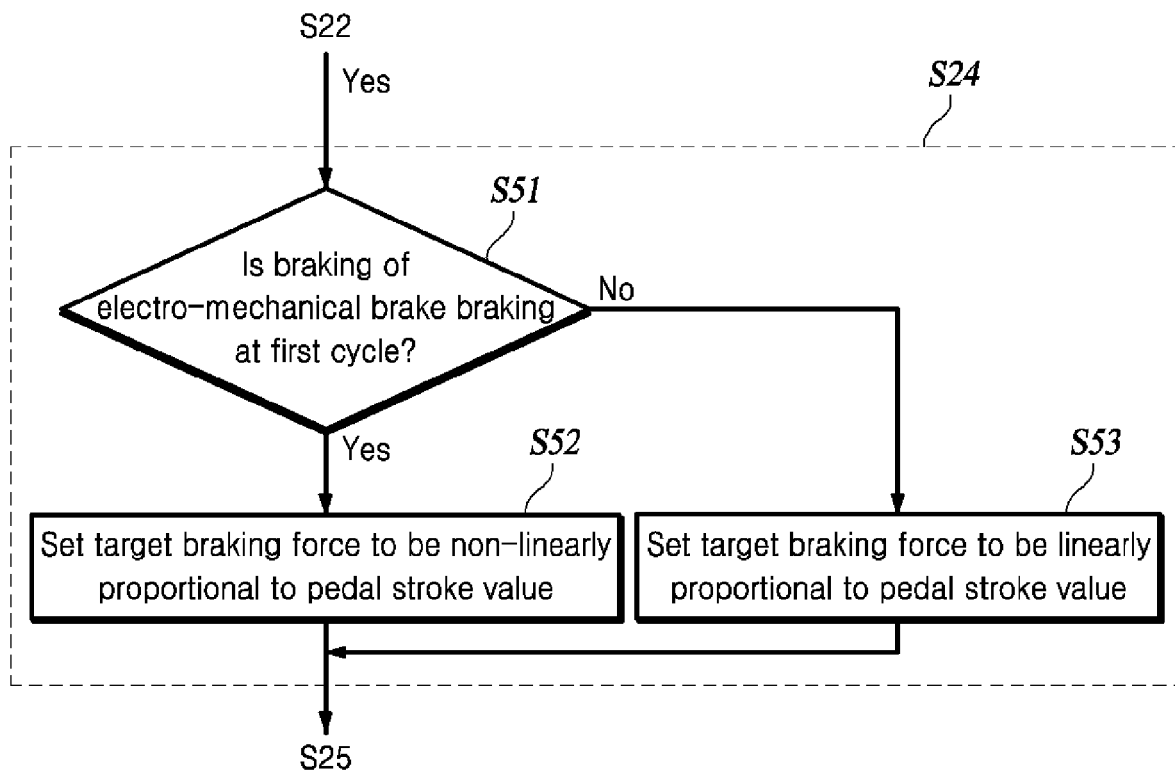
FIG. 5 is a flowchart illustrating as specific example of step S24 of FIG. 2.

FIG. 5 is a flowchart illustrating as specific example of step S24 of FIG. 2.

Figure 6:
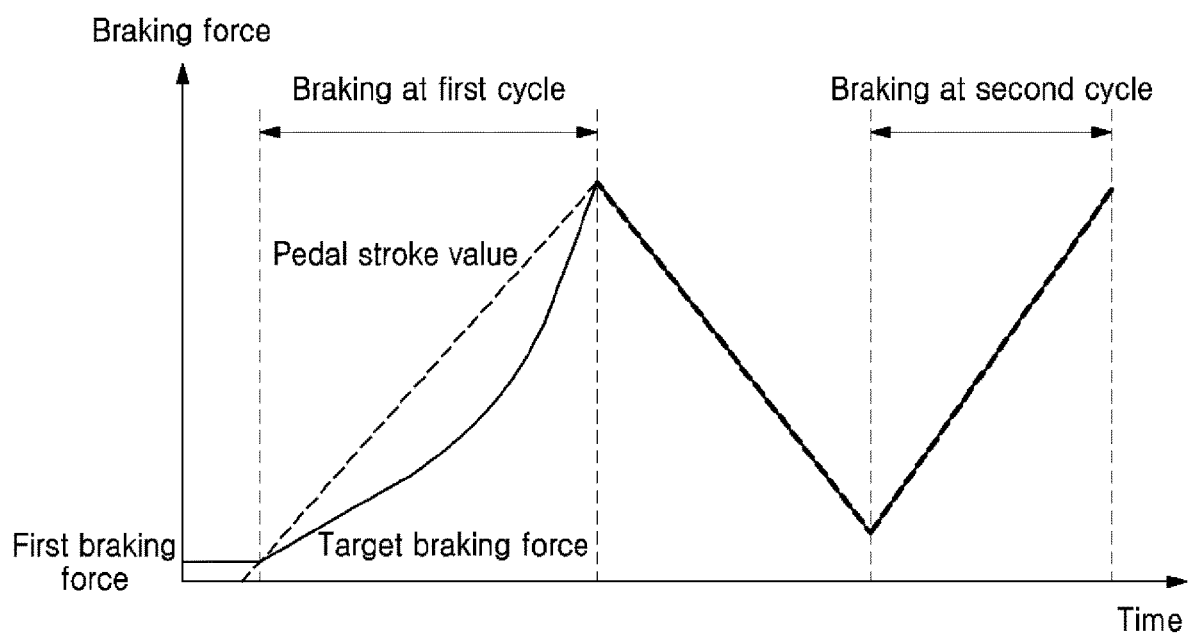
FIG. 6 is a graph of a braking force over time when the electro-mechanical brake is controlled according to FIG. 5.

FIG. 6 is a graph of a braking force over time when the electro-mechanical brake is controlled according to FIG. 5.

Referring to FIGS. 5 and 6, when the pedal stroke value exceeds the first threshold, the control unit 101 may determine whether the braking of the electro-mechanical brake is braking at a first cycle (S51). Here, the braking at the first cycle refers to braking at the first cycle of continuous braking of the electro-mechanical brake. The braking at the first cycle means, for example, braking at a cycle corresponding to braking when the driver steps on the pedal a first time among N times (N is a natural number) in a case in which the driver steps on the pedal N times at 0.5 second intervals in order to brake the vehicle.

When the braking of the electro-mechanical brake is the braking at the first cycle, the control unit 101 may set the target braking force to be non-linearly proportional to the pedal stroke value (S52). On the other hand, when the braking of the electro-mechanical brake is not the braking at the first cycle, the control unit 101 may set the target braking force to be linearly proportional to the pedal stroke value (S53).

Figure 7:
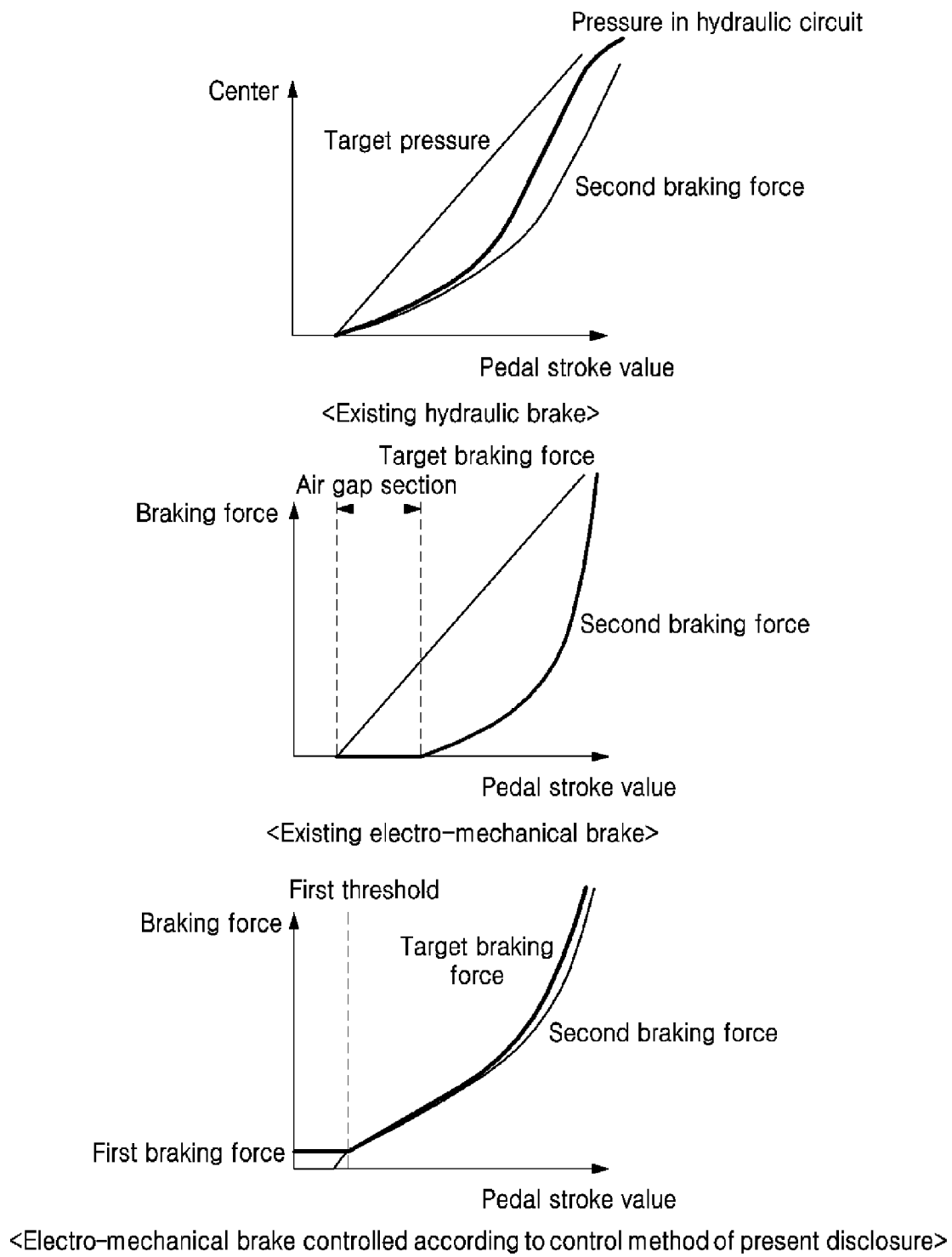
FIG. 7 is a graph showing an operation of an existing hydraulic brake, an existing electro-mechanical brake, and the electro-mechanical brake controlled according to the control method of the present disclosure.

FIG. 7 is a graph showing an operation of an existing hydraulic brake, an existing electro-mechanical brake, and the electro-mechanical brake controlled according to the control method of the present disclosure.

Operation and effects of the electro-mechanical brake controlled according to the control method of the present disclosure will be described with reference to FIG. 7.

The hydraulic brake generates a braking force using hydraulic pressure. Accordingly, the target braking force is different from the second braking force generated to correspond thereto. That is, the second braking force is generated with a delayed response time with respect to the target braking force. On the other hand, since electro-mechanical brake generates the braking force using the motor, a delay rate of the second braking force is lower than that in the hydraulic brake. Accordingly, the driver feels sense of abrupt braking when a vehicle having the electro-mechanical brake mounted thereon is braked.

When the pedal stroke value does not exceed the first threshold, the existing electro-mechanical brake does not generate the braking force. Accordingly, when the pedal stroke value exceeds the first threshold and the electro-mechanical brake generates the second braking force, the braking force is not generated in a section in which there is the air gap. Because of a difference between the target braking force and the second braking force that occurs because the braking force is not generated in the section in which there is the air gap, there is a problem that the existing electro-mechanical brake abruptly generates the second braking force. With the control method and apparatus for an electro-mechanical brake according to the present disclosure, the section in which there is the air gap is minimized by generating the first braking force when the pedal stroke value does not exceed the first threshold. With the control method and apparatus for an electro-mechanical brake according to the present disclosure, the target braking force is set by simulating the braking force generated by the hydraulic brake. With the control method and apparatus for an electro-mechanical brake according to the present disclosure, it is possible to minimize sense of abrupt braking by setting the target braking force to be non-linearly proportional to the pedal stroke value without generating an air gap section. However, with the control method and apparatus for an electro-mechanical brake according to the present disclosure, when the electro-mechanical brake is in the abruptly braked state or the emergently braked state, the target braking force is set to be linearly proportional to the pedal stroke value in order to quickly cope with braking. With the control method and apparatus for an electro-mechanical brake according to the present disclosure, the target braking force is set to be linearly proportional to the pedal stroke value in consideration of the fact that there is no air gap section at the second or more cycle of the continuous braking.

The flowchart of the present disclosure describes processes as being sequentially executed, but this is merely illustrative of the technical idea of an embodiment of the present disclosure. In other words, since it is apparent to those having ordinary skill in the art that an order described in the flowchart may be changed or one or more processes may be executed in parallel without departing from the essential characteristics of an embodiment of the present disclosure, the flowchart is not limited to a time-series order.

Various implementations of systems and techniques described herein may be realized as digital electronic circuits, integrated circuits, field programmable gate arrays (FPGAs), application specific integrated circuits (ASICs), computer hardware, firmware, software, and/or combinations thereof. These various implementations may include one or more computer programs executable on a programmable system. The programmable system includes at least one programmable processor (which may be a special-purpose processor or a general-purpose processor) coupled to receive and transmit data and instructions from and to a storage system, at least one input device, and at least one output device. The computer programs (also known as programs, software, software applications or codes) contain commands for a programmable processor and are stored in a "computer-readable recording medium".

The computer-readable recording medium includes all types of recording devices in which data readable by a computer system is stored. Such a computer-readable recording medium may be a non-volatile or non-transitory medium, such as ROM, CD-ROM, magnetic tape, floppy disk, memory card, hard disk, magneto-optical disk, or a storage device, and may further include a transitory medium such as a data transmission medium. In addition, the computer-readable recording medium may be distributed in a computer system connected via a network, so that computer-readable codes may be stored and executed in a distributed manner.

Various implementations of systems and techniques described herein may be embodied by a programmable computer. Here, the computer includes a programmable processor, a data storage system (including volatile memory, non-volatile memory, or other types of storage systems, or combinations thereof) and at least one communication interface. For example, the programmable computer may be one of a server, a network device, a set top box, an embedded device, a computer expansion module, a personal computer, a laptop, a personal data assistant (PDA), a cloud computing system, or a mobile device.

Although exemplary embodiments of the present disclosure have been described for illustrative purposes, those having ordinary skill in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand that the scope of the claimed invention is not to be limited by the above explicitly described embodiments but by the claims and equivalents thereof.

What is claimed is:

1. A method for controlling an electro-mechanical brake (EMB) of a vehicle, comprising:
    measuring a pedal stroke value;
    determining whether the pedal stroke value exceeds a first threshold;
    in response to determining that the pedal stroke value does not exceed the first threshold, generating a first braking force for reducing an air gap of the EMB;
    in response to determining that the pedal stroke value exceeds the first threshold, setting a target braking force for decelerating the vehicle; and
    after setting the target braking force, generating a second braking force based on the target braking force,
    wherein a magnitude of the first braking force is determined based on an increase rate of the pedal stroke value over time, and
    wherein the target braking force is proportional to the pedal stroke value.

2. The method of claim 1, wherein generating the first braking force includes performing field weakening control to control a motor of the EMB.

3. The method of claim 1, wherein the first braking force increases proportionally to the increase rate.

4. The method of claim 1, wherein setting the target braking force includes:
    determining whether the increase rate exceeds a second threshold; and
    in response to determining that the increase rate exceeds the second threshold, setting the target braking force to be linearly proportional to the pedal stroke value.

5. The method of claim 1, wherein setting the target braking force includes:
    determining whether the EMB is braking at a first cycle; and
    in response to determining that the EMB is not braking at the first cycle, setting the target braking force to be linearly proportional to the pedal stroke value.

6. The method of claim 1, wherein the second braking force is generated with a magnitude corresponding to that of the target braking force.

7. An apparatus for controlling an electro-mechanical brake (EMB) of a vehicle, comprising:
- a sensor unit including a pedal stroke sensor connected to a brake pedal of the vehicle and configured to measure a stroke of the brake pedal; and
- a control unit configured to receive, from the sensor unit, a pedal stroke value and control a braking force of the EMB based on the pedal stroke value,
- wherein the control unit is configured to:
  - determine whether the pedal stroke value exceeds a first threshold;
  - in response to determining that the pedal stroke value does not exceed the first threshold, generate a first braking force for reducing an air gap of the EMB; and
  - in response to determining that the pedal stroke value exceeds the first threshold, set a target braking force based on the pedal stroke value and generate a second braking force based on the target braking force.

8. The apparatus for an EMB of claim 7, wherein, for generating the first braking force, the control unit is configured to perform field weakening control to control a motor of the EMB.

9. The apparatus for an EMB of claim 7, wherein the control unit is configured to:
- determine whether an increase rate of the pedal stroke value over time exceeds a second threshold;
- in response to determining that the increase rate exceeds the second threshold, set the target braking force to be linearly proportional to the pedal stroke value; and
- in response to determining that the increase rate does not exceeds the second threshold, set the target braking force to be non-linearly proportional to the pedal stroke value.

10. The apparatus for an EMB of claim 7, wherein the control unit is further configured to:
- determine whether the EMB is braking at a first cycle;
- in response to determining that the EMB is not braking at the first cycle, set the target braking force to be linearly proportional to the pedal stroke value; and
- in response to determining that the EMB is braking at the first cycle, set the target braking force to be non-linearly proportional to the pedal stroke value.

\* \* \* \* \*